(12) United States Patent
Kang et al.

(10) Patent No.: US 8,136,829 B1
(45) Date of Patent: Mar. 20, 2012

(54) FORCE CHANNELLING CENTRALIZATION MOUNTAIN BIKE AND FRAME

(76) Inventors: Alan H. Kang, Anaheim, CA (US); Ted K. Tanouye, Fullerton, CA (US)

( * ) Notice: Subject to any disclaimer, the term of this patent is extended or adjusted under 35 U.S.C. 154(b) by 88 days.

(21) Appl. No.: 12/767,622

(22) Filed: Apr. 26, 2010

Related U.S. Application Data

(63) Continuation-in-part of application No. 12/098,399, filed on Apr. 4, 2008, now Pat. No. 7,703,788, and a continuation-in-part of application No. 12/256,152, filed on Oct. 22, 2008, now abandoned.

(51) Int. Cl.
*B62K 3/00* (2006.01)
*B62K 19/00* (2006.01)
*B62K 25/00* (2006.01)

(52) U.S. Cl. ............. 280/284; 280/275; 280/281.1; 280/283; 280/288

(58) Field of Classification Search ............ 280/274, 280/275, 281.1, 283, 284, 285, 288
See application file for complete search history.

(56) References Cited

U.S. PATENT DOCUMENTS

| | | | | |
|---|---|---|---|---|
| 5,611,557 A * | 3/1997 | Farris et al. | ........... | 280/275 |
| 5,685,553 A * | 11/1997 | Wilcox et al. | ........... | 280/283 |
| 5,725,227 A * | 3/1998 | Mayer | ........... | 280/284 |
| 5,791,674 A * | 8/1998 | D'Aluisio et al. | ........... | 280/284 |
| 5,899,480 A * | 5/1999 | Leitner | ........... | 280/284 |
| 6,161,858 A * | 12/2000 | Tseng | ........... | 280/281.1 |
| 6,244,610 B1 * | 6/2001 | Kramer-Massow | ........... | 280/283 |
| 6,581,950 B1 * | 6/2003 | Ellsworth | ........... | 280/284 |
| 6,712,374 B2 * | 3/2004 | Assier | ........... | 280/284 |
| 6,969,081 B2 * | 11/2005 | Whyte | ........... | 280/284 |
| 7,210,695 B2 * | 5/2007 | Griffiths | ........... | 280/283 |
| 7,395,892 B2 * | 7/2008 | Alonzo | ........... | 180/227 |
| 7,717,212 B2 * | 5/2010 | Weagle | ........... | 180/227 |
| 7,784,810 B2 * | 8/2010 | Graney | ........... | 280/284 |
| 7,806,422 B2 * | 10/2010 | I | ........... | 280/284 |
| 7,815,207 B2 * | 10/2010 | Currie | ........... | 280/284 |
| 7,918,472 B2 * | 4/2011 | Peterson | ........... | 280/283 |
| 7,938,425 B2 * | 5/2011 | Chamberlain | ........... | 280/284 |
| 8,033,558 B2 * | 10/2011 | Earle | ........... | 280/284 |
| 2004/0061305 A1 * | 4/2004 | Christini | ........... | 280/284 |
| 2005/0285367 A1 * | 12/2005 | Chang et al. | ........... | 280/284 |
| 2008/0054595 A1 * | 3/2008 | Lu | ........... | 280/284 |
| 2009/0001685 A1 * | 1/2009 | Talavasek et al. | ........... | 280/281.1 |
| 2009/0102158 A1 * | 4/2009 | Antonot | ........... | 280/284 |
| 2010/0007113 A1 * | 1/2010 | Earle et al. | ........... | 280/284 |
| 2011/0278818 A1 * | 11/2011 | Talavasek et al. | ........... | 280/288 |

* cited by examiner

*Primary Examiner* — Kevin Hurley
*Assistant Examiner* — Marc Scharich
(74) *Attorney, Agent, or Firm* — Thomas F. Woods

(57) ABSTRACT

Disclosed are various embodiments of a mountain bike frame and method of making a mountain bike frame where a rear suspension shock absorber is configured to compress when a rear triangle moves upwardly with respect to a force channelling top tube and a seat tube. At least portions of forces generated by upward movement of the rear triangle with respect to the force channelling top tube and the seat tube are transmitted through elongated front and rear torque conversion devices to the shock absorber, a shock absorber mount and the force channelling top tube. An upper portion of the front torque conversion device and a rear portion of the rear torque conversion device, when the mountain bike frame is viewed from a right side view, each rotate in a clockwise direction when the rear triangle moves upwardly with respect to the force channelling top tube and the seat tube.

8 Claims, 4 Drawing Sheets

FORCE CHANNELLING CENTRALIZATION MOUNTAIN BIKE AND FRAME

RELATED APPLICATIONS

This patent application is a continuation-in-part of, and claims priority and other benefits from, U.S. patent application Ser. No. 12/098,399 entitled "Force Channelling Mountain Bike Rear Suspension" to Tanouye et al. filed Apr. 4, 2008 (hereafter "the '399 patent application) and U.S. patent application Ser. No. 12/256,152 entitled "Center of Mass Technology for Mountain Bike Frame" to Tanouye et al. filed Oct. 22, 2008 (hereafter "the '152 patent application). The respective entireties of the '399 and '152 patent applications are hereby incorporated by reference herein.

FIELD OF THE INVENTION

Various embodiments of the invention described herein relate to the field of mountain bikes, mountain bike frames, and methods of making and using the same.

BACKGROUND

Bicycles designed to traverse rugged terrain, commonly known as mountain bikes, have been available for many years. An increasingly common feature of mountain bikes is their rear suspension systems. The rear suspension system prevents certain forces from being transferred by the terrain, against the bike, to the rider. It also increases rider control by maximizing tire contact with the terrain.

Mountain bike rear suspension systems that use shock-absorbing elements have placed great emphasis on correcting the problem of "jacking." See, for example, U.S. Pat. No. 5,899,480 to Leitner, which describes the "jacking" than can occur because of the design of "swingarm" rear suspension systems ("[i]n simple swingarm rear suspension [systems], the swing arms pivot sharply upward when a surge of power is supplied to the rear wheel, and pivot downward again when the power is backed off"). When a mountain bike is ridden over rough terrain, such "jacking" can reduce the contact of the rear wheel with the riding surface, which can severely compromise the rider's control over the bike. Additionally, in some prior art designs, forces are imparted to the seat tube (or any other area of the main frame that is not properly aligned with a key structural member of the frame), which creates forces on the bike that work against the forward propulsion induced by pedaling.

The rear suspensions of some prior art mountain bike designs can suffer from various deficiencies and inadequacies. For example, some frame designs require complicated manufacturing techniques to work around an uninterrupted seat tube and seat mast to mount a shock-activating link on the seat tube. This is due to the shape of the frame, which requires the seatpost to be constructed of two separate elements, thereby increasing the time needed to manufacture and assemble the components of the frame. This increases the cost of manufacturing and decreases the efficiency of workers and use of materials. Some frame designs utilize a link system that is not a structurally robust frame member, thereby creating a weak structural element. The rear shock in some frame designs is mounted to the frame by a means of an attached throughshaft, where one end of the shock rests and is bolted to the opposing side of the frame. This throughshaft can form a weak element of the frame. Other prior art mountain bike frame designs provide no or inadequate conduits or channels for the forces generated by the rider and the ground to be directed into strong load bearing structures.

What is needed is a mountain bike capable of efficiently channelling the external forces operating thereon, that does not jack or that exhibits a reduced tendency to jack, that is stronger, and that is lighter.

SUMMARY

In one embodiment, there is provided a mountain bike frame comprising a force channelling top tube comprising a front portion and a rear portion, a shock absorber mount attached to or forming a portion of the top tube, a down tube comprising front and rear portions, a front torque conversion device mount attached to or forming a portion of the down tube, a head tube having the front portion of the top tube attached to an upper portion of the head tube and the front portion of the down tube attached to a lower portion of the head tube, a seat tube comprising top and bottom portions, the rear portion of the top tube being attached to the top portion of the seat tube, the rear portion of the down tube being attached to the bottom portion of the seat tube, a rear triangle comprising upper seat stays and lower chain stays, the upper seat stays comprising at least one forward portion located forward of the seat tube, an elongated rear torque conversion device having a front portion pivotally attached to the bottom portion of the seat tube and a rear portion pivotally attached to the lower chain stays, a shock absorber comprising forward and rearward portions, the forward portion of the shock absorber being attached to the shock absorber mount, and a distance between the rearward portion of the shock absorber and the top tube being substantially shorter than a distance between the rearward portion of the shock absorber and the down tube, and an elongated front torque conversion device comprising upper and lower portions, the lower portion of the front torque conversion device being pivotally attached to the front torque conversion device mount, the upper portion of the front torque conversion device being pivotally attached to the at least one forward portion of the upper seat stays and to the rearward portion of the shock absorber, wherein the shock absorber is configured to compress when the rear triangle moves upwardly with respect to the force channelling to tube and the seat tube, at least portions of forces generated by upward movement of the rear triangle with respect to the force channelling top tube and the seat tube are transmitted through the front and rear torque conversion devices to the shock absorber, the shock absorber mount and the force channelling top tube, and wherein the upper portion of the front torque conversion device and the rear portion of the rear torque conversion device, when the mountain bike frame is viewed from a right side view, each rotate in a clockwise direction when the rear triangle moves upwardly with respect to the force channelling top tube and the seat tube.

In another embodiment, there is provided a method of making a mountain bike frame comprising attaching, or forming as a portion of, a shock absorber mount to a force channelling top tube comprising a front portion and a rear portion, attaching, or forming as a portion of, a front torque conversion device mount to a down tube comprising front and rear portions, attaching the front portion of the top tube to an upper portion of a head tube and attaching the front portion of the down tube to a lower portion of the head tube, attaching the rear portion of the top tube to a top portion of a seat tube, and the rear portion of the down tube to a bottom portion of the seat tube, pivotally mounting a front portion of an elongated rear torque conversion device to the bottom portion of the seat tube and pivotally mounting a rear portion of the rear torque conversion device to lower chain stays of a rear triangle, the rear triangle further comprising upper seat stays, attaching a forward portion of a shock absorber to the shock absorber mount, pivotally attaching an upper portion of an elongated front torque conversion device to at least one forward portion of the upper seat stays located forward of the seat tube, pivotally attaching a lower portion of the front torque conversion device to the front torque conversion device mount, attaching the upper portion of the front torque conversion device to a rearward portion of the shock absorber, wherein a distance between the rearward portion of the shock absorber and the top tube is substantially shorter than a distance between the rearward portion of the shock absorber and the down tube, wherein the shock absorber is configured to compress when the rear triangle moves upwardly with respect to the force channelling top tube and the seat tube, at least portions of forces generated by upward movement of the rear triangle with respect to the force channelling top tube and the seat tube are transmitted through the front and rear torque conversion devices to the shock absorber, the shock absorber mount and the force channelling top tube, and wherein the upper portion of the front torque conversion device and the rear portion of the rear torque conversion device, when the mountain bike frame is viewed from a right side view, each rotate in a clockwise direction when the rear triangle moves upwardly with respect to the force channelling top tube and the seat tube.

BRIEF DESCRIPTION OF THE DRAWINGS

Different aspects of the various embodiments of the invention will become apparent from the following specification, drawings and claims in which:

The drawings are not necessarily to scale. Like numbers refer to like parts or steps throughout the drawings.

DETAILED DESCRIPTIONS OF SOME PREFERRED EMBODIMENTS

Figure 1:
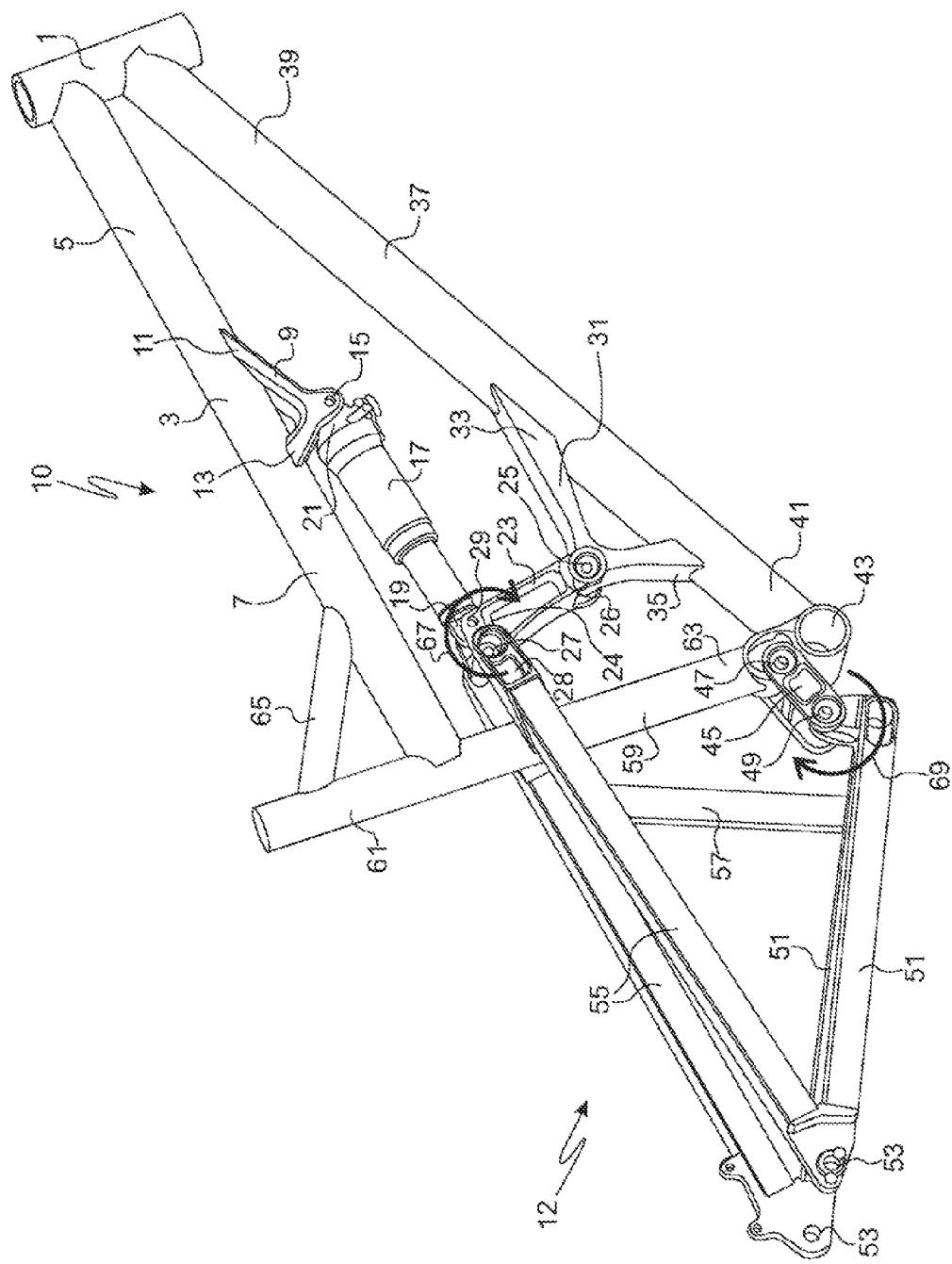
FIG. 1 shows a right perspective side view of one embodiment of a mountain bike frame.
Figure 2:
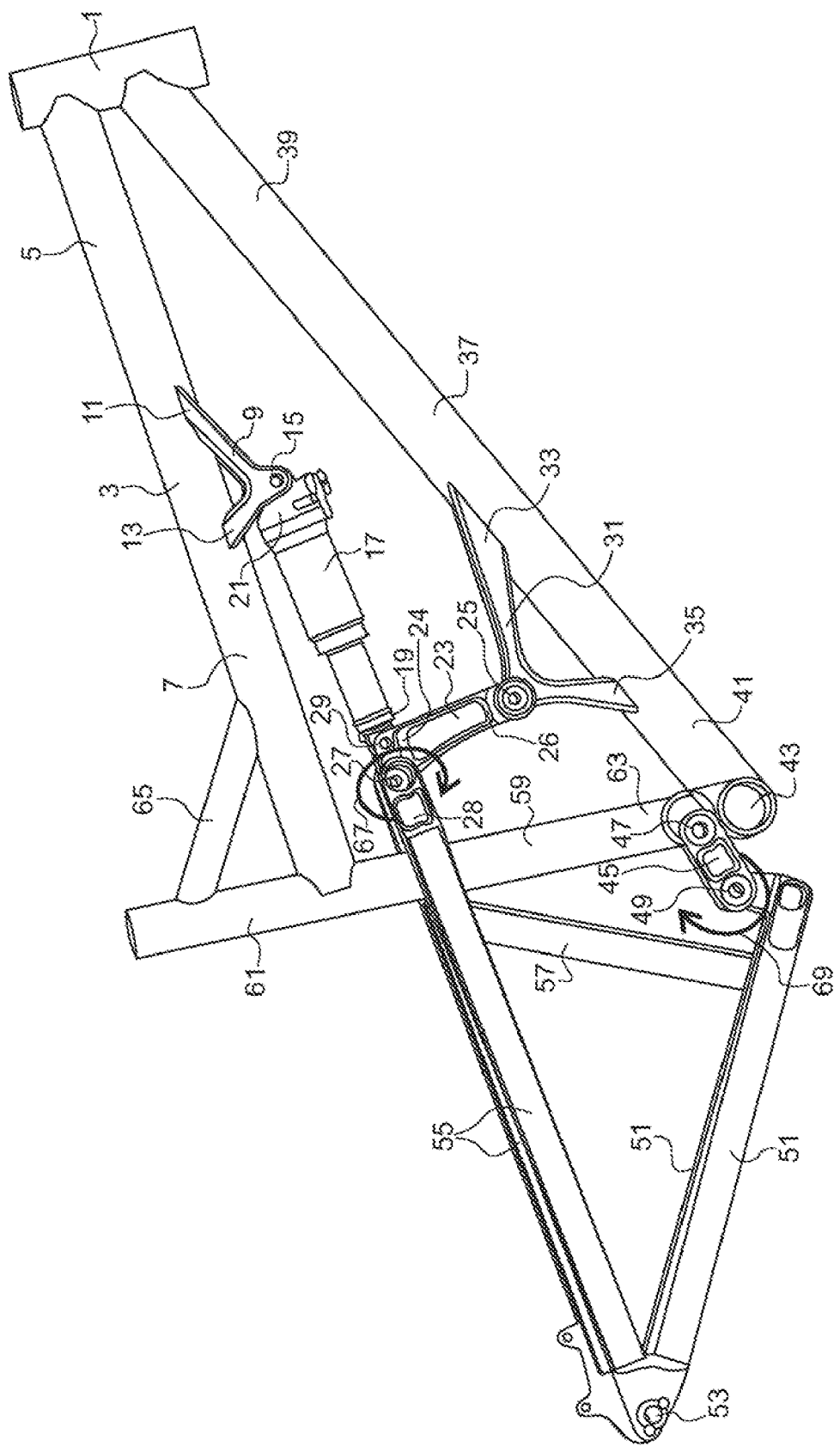
FIG. 2 shows a right side view of the mountain bike frame of FIG. 1.
Figure 3:
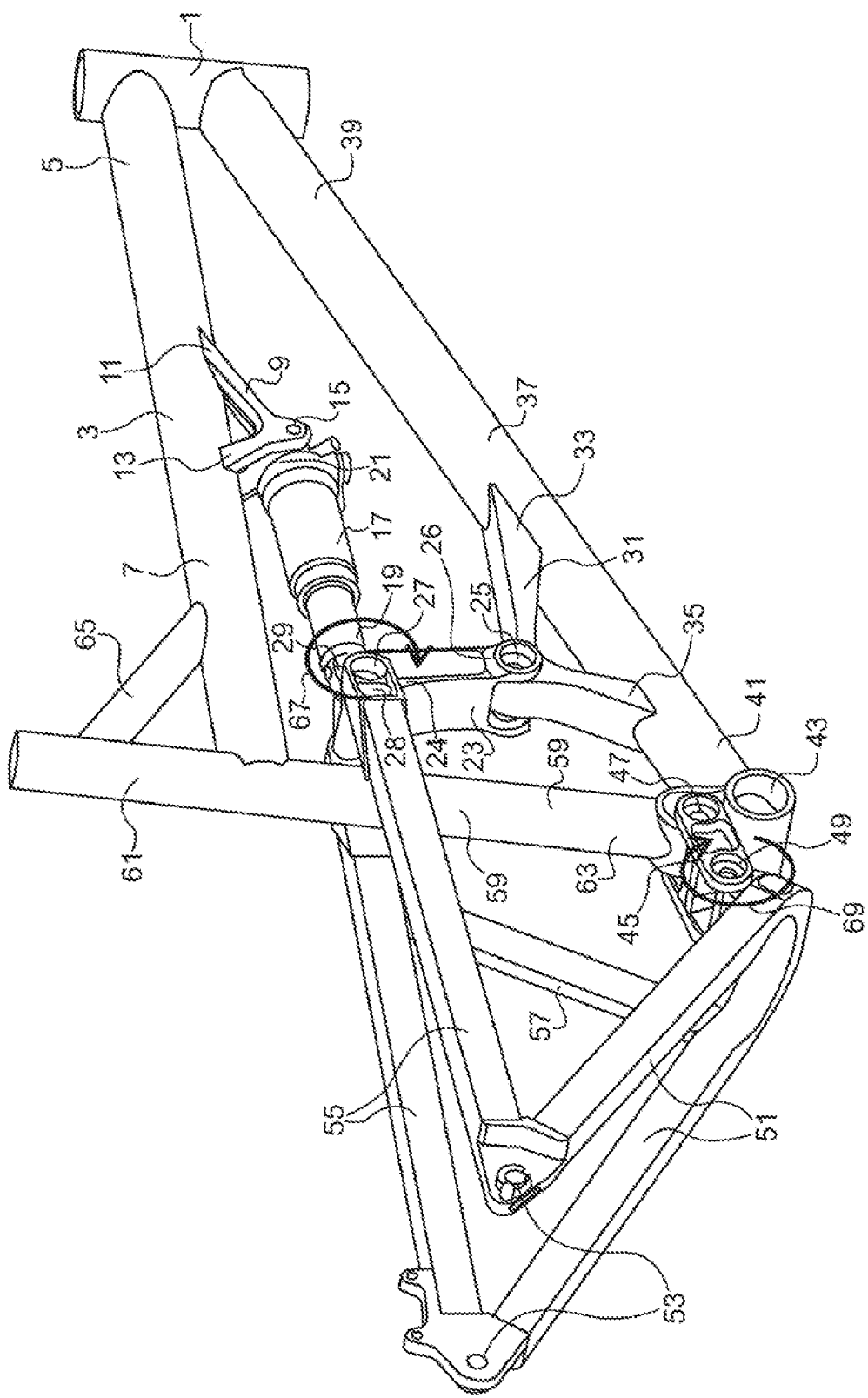
FIG. 3 shows a right rear perspective view of the mountain bike frame of FIG. 1.

Referring now to FIGS. 1 through 4, there is shown a mountain bike frame 10 comprising rear triangle 12. As shown, force channelling top tube 3 comprises front portion 5 and rear portion 7. Shock absorber mount 9 is attached to or forms a portion of top tube 3. Down tube 37 comprises front portion 39 and rear portion 41. Front torque conversion device mount 31 is attached to or forms a portion of down tube 37. Front portion 5 of top tube 3 is attached to an upper portion of head tube 1, while front portion 39 of down tube 37 is attached to a lower portion of head tube 1. Seat tube 59 comprises top portion 61 and bottom portion 63. Rear portion 7 of top tube 3 is attached to top portion 61 of seat tube 59. Rear portion 41 of down tube 37 is attached to bottom portion 63 of seat tube 59. Rear triangle 12 comprises upper seat stays 55 and lower chain stays 51. Upper seat stays 55 comprise at least one forward portion 28 located forward of seat tube 59. Rear torque conversion device 45 has a front portion thereof 47 pivotally attached to bottom portion 63 of seat tube 59 and a rear portion thereof 49 pivotally attached to lower chain stays 51. Shock absorber 17 comprises forward portion 21 and rearward portion 19. As will be seen, particularly with reference to FIG. 2, a distance between rearward portion 19 of shock absorber 17 and the top tube 3 is substantially shorter than a distance between rearward portion 19 of shock absorber 17 and the down tube 37. Forward portion 21 is attached to shock absorber mount 9. Front torque conversion device 23 comprises upper portion 24 and top pivot 27 and lower portion 26 and bottom pivot 25. Lower portion 26 is pivotally attached to the front torque conversion device mount 31 by means of pivot 25. Upper portion 24 is pivotally attached to the at least one forward portion 28 of upper seat stays 55, as well as to rearward portion 19 of shock absorber 17 by means of attachment or connection 29.

Figure 4:
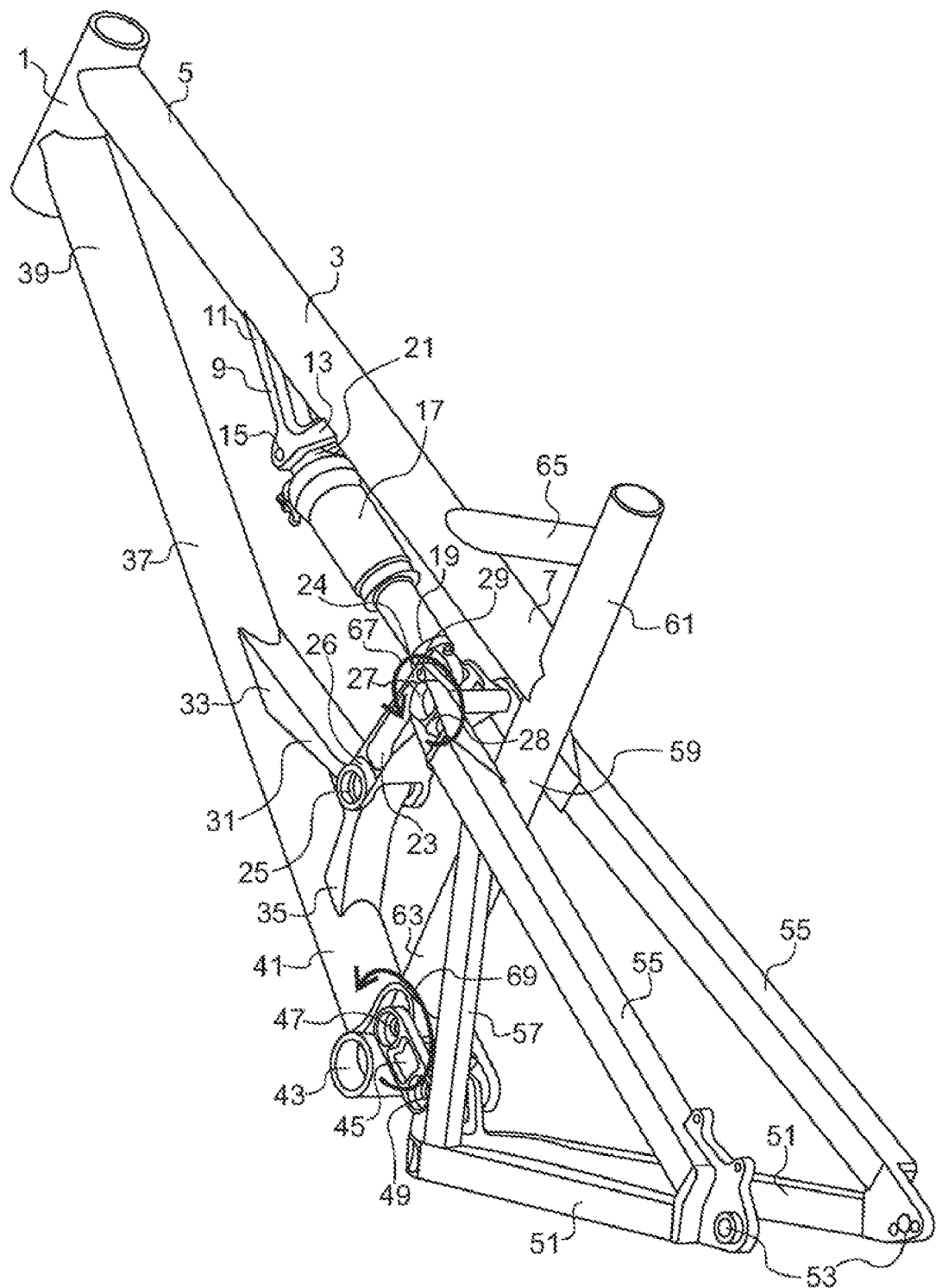
FIG. 4 shows a left top rear perspective view of the mountain bike frame of FIG. 1.

Continuing to refer to FIGS. 1 through 4, it will be seen that shock absorber 17 is configured to compress when rear triangle 12 moves upwardly with respect to force channelling top tube 3 and seat tube 59. At least portions of forces generated by upward movement of rear triangle 12 with respect to force channelling top tube 3 and seat tube 59 are transmitted through rear torque conversion device 45 and front torque conversion device 23 to shock absorber 17, shock absorber mount 9, and force channelling top tube 3.) As shown in the Figures, and more specifically in FIGS. 1 through 3, upper portion 24 of front torque conversion device 23 and rear portion 49 of rear torque conversion device 45, when viewed from various right side views, each rotate in a clockwise direction when rear triangle 12 moves upwardly with respect to force channelling top tube 3 and seat tube 59. As shown in FIG. 4, when viewed from a left top rear perspective view, upper portion 24 of front torque conversion device 23 and rear portion 49 of rear torque conversion device 45 each rotate in a counterclockwise direction when rear triangle 12 moves upwardly with respect to force channelling top tube 3 and seat tube 59.

As further shown in FIGS. 1 through 4, mountain bike frame 10 may further comprise an optional seat tube to top tube strut 65 extending between upper portion 61 of seat tube 59 and rear portion 7 of top tube 3. Optional strut 65 reinforces top tube 3 and seat tube 59, more about which is said below. Strut 65 may be a gusset, a tube, or other structural member configured to strengthen the mountain bike frame 10. In the Figures, front torque conversion device mount 31 is shown as comprising front portion 33 and rear portion 35, each of which is attached to down tube 37. Those skilled in the art will understand that many structural configurations for front torque conversion device mount 31 other than that shown in the Figures are possible. Front torque conversion device mount 31 may be welded to down tube 37. Also in the Figures, shock absorber mount 9 is shown as comprising front portion 11 and rear portion 13 attached to top tube 3. Those skilled in the art will understand that many structural configurations for shock absorber mount 9 other than that shown in the Figures are possible. Shock absorber mount 9 may be welded to top tube 3.

In FIGS. 1 through 4, the rear triangle 12 is shown as further comprising at least one stay stabilization member 57, which extends between and is attached to one of the upper seat stays 55 and one of the lower chain stays 51. The at least one stay stabilization member 57 strengthens and imparts rigidity to rear triangle 12. More than one stabilization member 57 may be employed in rear triangle 12, such as a second stabilization member 57 on the opposite side of rear triangle 12. In the embodiment shown in the Figures, the rear triangle 12 is a rigid, structurally unitary, one-piece, rear triangle. Note, however, that other embodiments of rear triangle 12 are contemplated, such as rear triangles having additional pivot points not shown in the Figures in manners well known in the art.

In the Figures, bottom bracket 43 is located at or near an intersection of seat tube 59 and down tube 37 in a structural configuration well known in the art. In a configuration operable by a user on a mountain bike trail, mountain bike frame 10 may further comprise front and rear wheels operably attached thereto, a crank assembly operably attached thereto, a front fork and corresponding front shock absorber operably attached thereto, front and rear brakes operably attached thereto, and front and rear derailleurs operably attached thereto, thereby forming a complete mountain bike.

Referring again to FIGS. 1 through 4, it will be seen that impacts acting on the mountain bike frame 10, via an operably attached rear wheel (not shown), are transferred via the one-piece rear triangle 12 to the front and rear torque conversion devices 23 and 45. Front torque conversion device 23 is assigned the task of transferring forces imparted to the rear wheel through bumps, landings, and other small or high impact activities to shock absorber 17 and thence to top tube 3. Shock absorber 17 transforms energy input thereof into heat, while further forces are directed into and absorbed by force channelling top tube 3. Force channelling top tube 3 may also be stabilized and strengthened by strut 65, which provides an even stronger foundation for the mountain bike frame 10 to absorb forces directed thereto which originate from the rear wheel.

Mountain bike frame 10 employs two torque conversion devices—front torque conversion device 23 and rear torque conversion device 45. As previously described, when viewed from the right side of the mountain bike frame 10, both torque conversion devices 23 and 45 pivot in a clockwise direction, as indicated by arrows 67 and 69 shown in FIGS. 1 through 4. This gives the mountain bike frame 10 the ability to transfer forces efficiently in the direction of force channelling top tube 3 and shock absorber 17. Most forces imparted to the rear wheel (not shown) having an upward or vertical component are channelled towards force channelling top tube 3. Additionally, rear torque conversion device 45 supplements and aids the action of front torque conversion device 23 by directing forces acting on rear torque conversion device 45 towards force channelling top tube 3. The connection of front torque conversion device 23 to down tube 37 provides significant benefits. First, down tube 37 is typically the strongest or widest diameter tube on the mountain bike frame 10, which provides a sturdy foundation upon which front torque conversion device 23 can pivot and operate without down tube 37 flexing (which could lead to undesired frame movement and energy loss). Second, by having front torque conversion device 23 situated in or near the middle of mountain bike frame 10, the mass of frame 10 is essentially centralized beneath the trunk of the rider, thereby providing better handling and maintaining the combined mass of the rider and frame 10 in a substantially stationary and stable position located along an imaginary vertical line. Third, by attaching front torque conversion device 23 to down tube 37, forces from the rear wheel are also centralized near front torque conversion device 23, and then channelled into the stronger structural area of head tube 1 to provide a balanced ride when the rear suspension is active. Such a structural configuration provides clear benefits with respect to designs that use seat tube 59 as the main pivot, which is a weaker structural tube and located further away from the center of mass of the bicycle.

In addition, the various embodiments of mountain bike frame 10 disclosed herein are amendable to be manufactured using simple and low-cost manufacturing techniques, unlike many other designs known in the art which can require the use of forging or shape manipulation of seat tubes and down tubes. Such specialized and expensive manufacturing techniques can also lead to a requirement for the use of special front derailleurs, monocoque pieces, or expensive tooling. In the various embodiments of the mountain bike frame 10 described herein, all tubes and torque conversion devices can be fabricated using standardized bicycle production equipment.

Note further that included within the scope of the present invention are methods of making and having made the various components, devices and systems described herein. For example, according to one embodiment there is provided a method of making a mountain bike frame comprising attaching, or forming as a portion of, a shock absorber mount to a force channelling top tube comprising a front portion and a rear portion, attaching, or forming as a portion of, a front torque conversion device mount to a down tube comprising front and rear portions, attaching the front portion of the top tube to an upper portion of a head tube and attaching the front portion of the down tube to a lower portion of the head tube, attaching the rear portion of the top tube to a top portion of a seat tube, and the rear portion of the down tube to a bottom portion of the seat tube, pivotally mounting a front portion of an elongated rear torque conversion device to the bottom portion of the seat tube and pivotally mounting a rear portion of the rear torque conversion device to lower chain stays of a rear triangle, the rear triangle further comprising upper seat stays, attaching a forward portion of a shock absorber to the shock absorber mount, pivotally attaching an upper portion of an elongated front torque conversion device to at least one forward portion of the upper seat stays located forward of the seat tube, pivotally attaching a lower portion of the front torque conversion device to the front torque conversion device mount, attaching the upper portion of the front torque conversion device to a rearward portion of the shock absorber, wherein a distance between the rearward portion of the shock absorber and the top tube is substantially shorter than a distance between the rearward portion of the shock absorber and the down tube, wherein the shock absorber is configured to compress when the rear triangle moves upwardly with respect to the force channelling top tube and the seat tube, at least portions of forces generated by upward movement of the rear triangle with respect to the force channelling top tube and the seat tube are transmitted through the front and rear torque conversion devices to the shock absorber, the shock absorber mount and the force channelling top tube, and wherein the upper portion of the front torque conversion device and the rear portion of the rear torque conversion device, when the mountain bike frame is viewed from a right side view, each rotate in a clockwise direction when the rear triangle moves upwardly with respect to the force channelling top tube and the seat tube.

The above-described embodiments should be considered as examples of the present invention, rather than as limiting the scope of the invention. In addition to the foregoing embodiments of the invention, review of the detailed description and accompanying drawings will show that there are other embodiments of the present invention. Accordingly, many combinations, permutations, variations and modifications of the foregoing embodiments of the present invention not set forth explicitly herein will nevertheless fall within the scope of the present invention.

LIST OF PARTS SHOWN IN THE FIGURES

| | |
|---|---|
| 1 | head tube |
| 3 | force channelling top tube |
| 5 | front portion of force channelling top tube |
| 7 | rear portion of force channelling top tube |
| 9 | shock absorber mount |
| 10 | force channelling centralization mountain bike frame |
| 11 | front portion of shock absorber mount |
| 12 | rear triangle |
| 13 | rear portion of shock absorber mount |
| 15 | shock absorber mount pivot or attachment point |
| 17 | shock absorber |
| 19 | rearward portion of shock absorber |
| 21 | forward portion of shock absorber |
| 23 | front torque conversion device |
| 24 | upper portion of front torque conversion device |
| 25 | bottom pivot of front torque conversion device |
| 26 | lower portion of front torque conversion device |
| 27 | top pivot of front torque conversion device/forward pivot of upper seat stays |
| 28 | at least one forward portion of upper seat stays |
| 29 | attachment joining front torque conversion device and shock absorber; |
| 31 | front torque conversion device mount |
| 33 | front portion of front torque conversion device mount |
| 35 | rear portion of front torque conversion device mount |
| 37 | down tube |
| 39 | front portion of down tube |
| 41 | rear portion of down tube |
| 43 | bottom bracket |
| 45 | rear torque conversion device |
| 47 | front pivot of rear torque conversion device |
| 49 | rear pivot of rear torque conversion device |
| 51 | lower chain stays |
| 53 | dropouts or wheel attachment points |
| 55 | upper seat stays |
| 57 | stay stabilization and force channelling member |
| 59 | seat tube |
| 61 | top portion of seat tube |
| 63 | bottom portion of seat tube |
| 65 | seat tube to top tube strut |
| 67 | direction of rotation of front torque conversion device when an upward force is applied to the rear triangle |
| 69 | direction of rotation of rear torque conversion device when an upward force is applied to the rear triangle |

The invention claimed is:

1. A mountain bike frame, comprising:
(a) a force channelling top tube comprising a front portion and a rear portion;
(b) a shock absorber mount attached to or forming a portion of the top tube;
(c) a down tube comprising front and rear portions, a front torque conversion device mount attached to or forming a portion of the down tube;
(d) a head tube having the front portion of the top tube attached to an upper portion of the head tube and the front portion of the down tube attached to a lower portion of the head tube;
(e) a seat tube comprising top and bottom portions, the rear portion of the top tube being attached to the top portion of the seat tube, the rear portion of the down tube being attached to the bottom portion of the seat tube;
(f) a rear triangle comprising upper seat stays and lower chain stays, the upper seat stays comprising at least one forward portion located forward of the seat tube;
(g) an elongated rear torque conversion device having a front portion pivotally attached to the bottom portion of the seat tube and a rear portion pivotally attached to the lower chain stays;
(h) a shock absorber comprising forward and rearward portions, the forward portion of the shock absorber being attached to the shock absorber mount, and a distance between the rearward portion of the shock absorber and the top tube being substantially shorter than a distance between the rearward portion of the shock absorber and the down tube, and
(i) an elongated front torque conversion device comprising upper and lower portions, the lower portion of the front torque conversion device being pivotally attached to the front torque conversion device mount, the upper portion of the front torque conversion device being pivotally attached to the at least one forward portion of the upper seat stays and to the rearward portion of the shock absorber;
wherein the shock absorber is configured to compress when the rear triangle moves upwardly with respect to the force channelling top tube and the seat tube, at least portions of forces generated by upward movement of the rear triangle with respect to the force channelling top tube and the seat tube are transmitted through the front and rear torque conversion devices to the shock absorber, the shock absorber mount and the force channelling top tube, and wherein the upper portion of the front torque conversion device and the rear portion of the rear torque conversion device, when the mountain bike frame is viewed from a right side view, each rotate in a clockwise direction when the rear triangle moves upwardly with respect to the force channelling top tube and the seat tube.

2. The mountain bike frame of claim 1, further comprising a strut extending between the top portion of the seat tube and the rear portion of the top tube.

3. The mountain bike frame of claim 1, wherein the front torque conversion device mount comprises front and rear portions attached to the down tube.

4. The mountain bike frame of claim 1, wherein the shock absorber mount comprises front and rear portions attached to the top tube.

5. The mountain bike frame of claim 1, wherein the rear triangle further comprises at least one stay stabilization member extending between and attached to one of the upper seat stays and one of the lower chain stays.

6. The mountain bike frame of claim 1, further comprising a bottom bracket located at or near an intersection of the seat tube and the down tube.

7. The mountain bike frame of claim 1, wherein the shock absorber mount is welded to the top tube.

8. The mountain bike frame of claim 1, wherein the front torque conversion device mount is welded to the down tube.

* * * * *